(12) United States Patent
Albrecht et al.

(10) Patent No.: US 7,848,048 B1
(45) Date of Patent: *Dec. 7, 2010

(54) PATTERNED MEDIA MAGNETIC RECORDING DISK DRIVE WITH WRITE CLOCK PHASE ADJUSTMENT FOR WRITE HEAD TRACK MISREGISTRATION

(75) Inventors: Thomas R Albrecht, San Jose, CA (US); Manfred Ernst Schabes, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 30 days.

This patent is subject to a terminal disclaimer.

(21) Appl. No.: 12/477,765

(22) Filed: Jun. 3, 2009

(51) Int. Cl.
*G11B 21/02* (2006.01)
(52) U.S. Cl. .......................................... 360/75
(58) Field of Classification Search ................ None
See application file for complete search history.

(56) References Cited

U.S. PATENT DOCUMENTS 4,965,782 A  10/1990 Mathews
6,411,453 B1   6/2002 Chainer et al.
2006/0119965 A1  6/2006 Ohno
2009/0244765 A1*  10/2009 Albrecht ...................... 360/75

FOREIGN PATENT DOCUMENTS

JP            2001243601          9/2001

OTHER PUBLICATIONS

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

* cited by examiner

*Primary Examiner*—K. Wong
(74) *Attorney, Agent, or Firm*—Thomas R. Berthold (57) ABSTRACT

A patterned-media magnetic recording disk drive has compensation for write head track misregistration (TMR) from the track centerline. As the disk rotates, the read head detects angularly spaced servo sectors and generates a position error signal (PES) which is used by the servo control system to maintain the read head on track. As the disk rotates, the read head also detects angularly spaced synchronization marks, which are used to control the write clock so that magnetization reversal of the magnetic write field from the write head is synchronized with the position of the data islands. If there is TMR of the write head, there will be an effective shift of $\Delta\phi$ in the timing of when the center of the data islands pass through the write field. The disk drive includes write clock phase adjustment circuitry that correlates the PES with $\Delta\phi$ to compensate for TMR of the write head.

20 Claims, 7 Drawing Sheets

| TRACK #(TR) | SKEW ANGLE (α) | RADIAL OFFSET (Re) | HEAD CIRCUMFERENTIAL OFFSET (HCO) |
|---|---|---|---|
| TR(n) | α(n) | Re(n) | HCO(n) |
| TR(n+10) | α(n+10) | Re(n+10) | HCO(n+10) |
| TR(163b) | α(163b) | Re(163b) | HCO(163b) |
| TR(n+20) | α(n+20) | Re(n+20) | HCO(n+20) |
| TR(n+30) | α(n+30) | Re(n+30) | HCO(n+30) |

| PES (nm) | Δϕ (nm) |
|---|---|
| -6 | -7.4 |
| -5 | -4.2 |
| -4 | -2.3 |
| -3 | -1.3 |
| -2 | -0.8 |
| -1 | -0.2 |
| 0 | 0.0 |
| +1 | -0.2 |
| +2 | -0.8 |
| +3 | -1.3 |
| +4 | -2.3 |
| +5 | -4.2 |
| +6 | -7.4 |

PATTERNED MEDIA MAGNETIC RECORDING DISK DRIVE WITH WRITE CLOCK PHASE ADJUSTMENT FOR WRITE HEAD TRACK MISREGISTRATION

BACKGROUND OF THE INVENTION

1. Field of the Invention

This invention relates generally to magnetic recording disk drives for use with patterned media, wherein each data bit is stored in a magnetically isolated block or island on the disk, and more particularly to such a disk drive with an improved clock for writing the data.

2. Description of the Related Art

Magnetic recording hard disk drives with patterned magnetic recording media have been proposed to increase the data density. In patterned media, the magnetic material on the disk is patterned into small isolated data blocks or islands arranged in concentric data tracks. Each island contains a single magnetic "bit" and is separated from neighboring islands by a nonmagnetic region. This is in contrast to conventional continuous media wherein a single "bit" is composed of multiple weakly-coupled neighboring magnetic grains that form a single magnetic domain and the bits are physically adjacent to one another. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned blocks, the magnetic moment of the regions between the blocks must be destroyed or substantially reduced so as to render these regions essentially nonmagnetic. Alternatively, the media may be fabricated so that that there is no magnetic material in the regions between the blocks.

In one type of patterned media, the data islands are elevated, spaced-apart pillars that extend above the disk substrate surface to define troughs or trenches on the substrate surface between the pillars. This type of patterned media is of interest because substrates with the pre-etched pattern of pillars and trenches can be produced with relatively low-cost, high volume processes such as nanoimprint lithography using a master template created by e-beam lithography and self-assembly, along with an appropriate etching method to transfer the pattern to the substrate. The magnetic recording layer material is then deposited over the entire surface of the pre-etched substrate to cover both the ends of the pillars and the trenches. The trenches are recessed far enough from the read/write head to not adversely affect reading or writing. This type of patterned media is described by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

In patterned media, because the data islands are single-domain, the transitions between bits occur only between the islands. Since the magnetic transitions are restricted to pre-determined locations governed by the locations of individual data islands, it is necessary to synchronize the switching of the write current and thus the reversal of the write field from the write head with the passing of individual data islands past the write head. The optimal phase of the write clock that controls the reversal of the write field depends on the position of the write head with respect to the centerline of the data track. This is because the outer boundary or contour of the write "bubble", i.e., the locus of magnetic field strength sufficient to magnetize the data islands, is curved at its trailing edge. Thus if the write head is not well-centered on the data track, but shifted by an amount of track misregistration (TMR) away from the track centerline, the data islands will not be located within the write bubble when the write field is reversed. This may lead to write errors on the selected track.

What is needed is a magnetic recording disk drive with patterned media that has a write-clock with phase adjustment to compensate for TMR of the write head.

SUMMARY OF THE INVENTION

The invention relates to a patterned-media magnetic recording disk drive with compensation for write head track misregistration (TMR) from the track centerline. The disk drive has a read head and a write head located on an air bearing slider associated with each disk surface. There is an effective radial offset between the read head and write head, with the radial offset being a known function of track number, so that when the read head is aligned with one data track the write head is aligned with a different data track. As the disk rotates, the read head detects angularly spaced servo sectors and generates a position error signal (PES) which is used by the servo control system to maintain the read head on track. As the disk rotates, the read head also detects angularly spaced synchronization marks, which are used to control the write clock so that magnetization reversal of the magnetic write field is synchronized with the position of the data islands beneath the write head. The write head produces a magnetic write field within a write "bubble", i.e., the region where the magnetic field has a strength sufficient to switch the magnetization of a data island. If the write head is shifted relative to the track centerline by the TMR, then the center of a data island whose magnetization is to be reversed passes through the boundary of the write bubble of the shifted write head sooner than it would pass through the boundary of the write bubble of the unshifted write head. This results in an effective shift of $\Delta\phi$ in the timing of when the center of the island passes through the boundary of the write bubble. The disk drive includes circuitry to adjust the phase of the write clock by the amount of $\Delta\phi$ to thus compensate for TMR of the write head. The phase adjustment circuitry uses a lookup table of PES values (which correspond to TMR values) and associated phase adjustment ($\Delta\phi$) values. As an alternative to the use of a lookup table, the value of $\Delta\phi$ may be calculated from an equation generated by a curve-fitting algorithm for values of PES and measured $\Delta\phi$ values.

For a fuller understanding of the nature and advantages of the present invention, reference should be made to the following detailed description taken together with the accompanying figures.

DETAILED DESCRIPTION OF THE INVENTION

Figure 1:
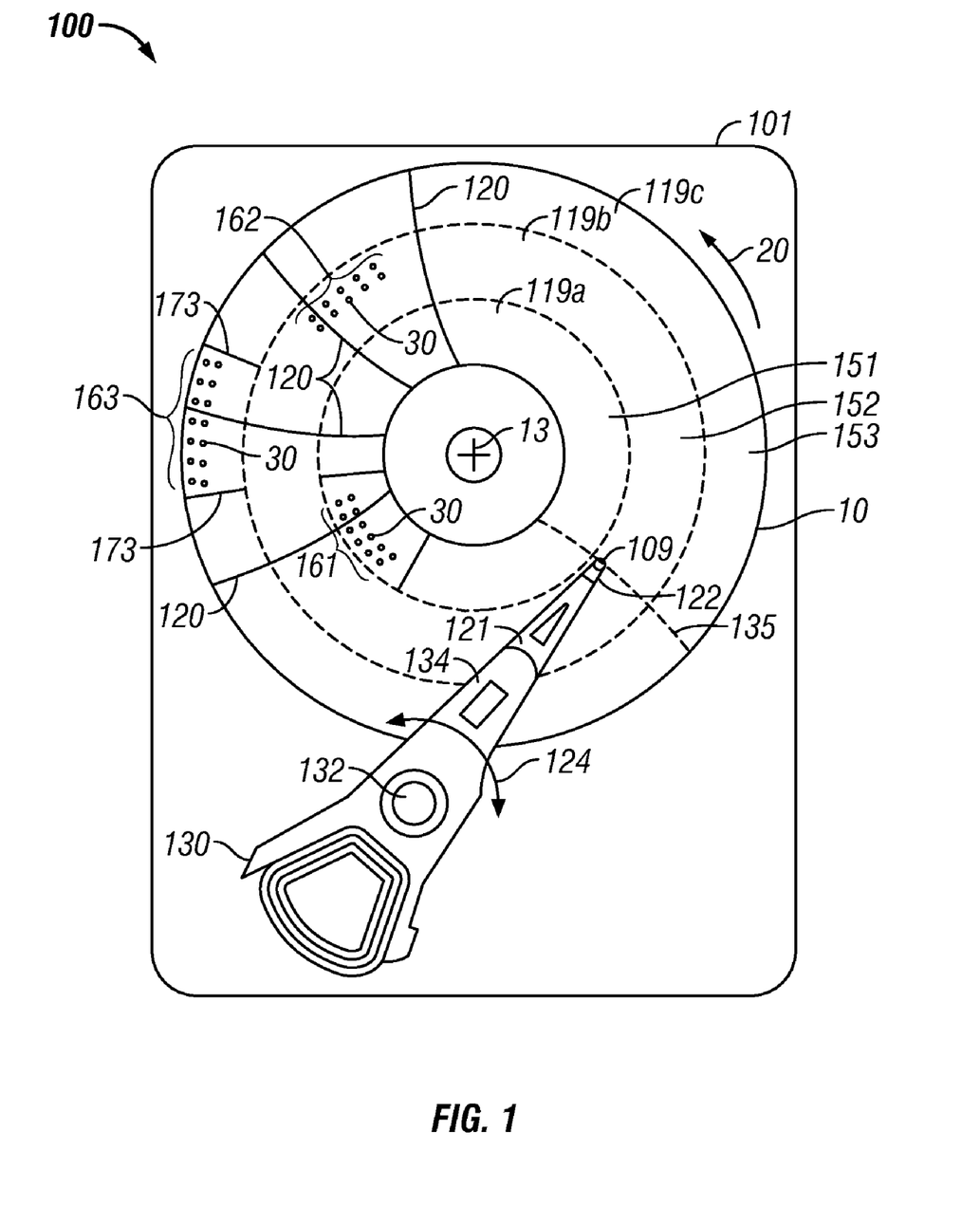
FIG. 1 is a top view of a patterned-media disk drive like that to which the present invention relates.

FIG. 1 is a top view of a patterned-media disk drive 100 like that to which the present invention relates. The drive 100 has a housing or base 101 that supports an actuator 130 and a spindle motor (not shown) for rotating the patterned-media magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier, such as an air-bearing slider 122, attached to the other end of suspension 121. The suspension 121 permits the head carrier 122 to be maintained very close to the surface of disk 10. The slider 122 supports the read/write or recording head 109. The recording head 109 is typically a combination of an inductive write head with a magnetoresistive read head (also called a read/write head) and is located on the trailing end or end face of the slider 122. Only one disk surface with associated slider and recording head is shown in FIG. 1, but there are typically multiple disks stacked on a hub that is rotated by a spindle motor, with a separate slider and recording head associated with each surface of each disk.

The patterned magnetic recording disk 10 includes a disk substrate with discrete data blocks or islands 30 of magnetizable material on the substrate. The data islands 30 function as discrete magnetic bits for the storage of data. Each discrete data island 30 is a magnetized block separated from other blocks by nonmagnetic regions or spaces. The term "nonmagnetic" means that the spaces between the data islands are formed of a nonferromagnetic material, such as a dielectric, or a material that has no substantial remanent moment in the absence of an applied magnetic field, or a magnetic material in a groove or trench recessed far enough below the blocks to not adversely affect reading or writing. The nonmagnetic spaces between the data islands may also be the absence of magnetic material, such as grooves or troughs in the magnetic recording layer or disk substrate.

The data islands 30 are arranged in radially-spaced circular tracks, with the tracks being grouped into annular bands or zones 151, 152, 153. Within each track, the data islands 30 are typically arranged in fixed-byte-length data sectors (e.g., 512 bytes plus additional bytes for error correction coding (ECC) and data sector header). The number of data sectors is different in each zone. The grouping of the data tracks into annular zones permits banded recording, wherein the angular spacing of the data islands, and thus the data rate, is different in each zone. In FIG. 1, three zones 151, 152, 153 are shown, with only portions of representative concentric data tracks, 161, 162, 163, being shown for each respective zone. While only three zones are depicted in FIG. 1, modern disk drives typically have about 20 zones. In each zone there are also generally radially-directed synchronization (sync) marks, like typical marks 173 in zone 153. Each sync mark 173 may be plurality of circumferentially-spaced marks, with the spacing being different in each zone, that are detected by the read head to enable the write head to be synchronized with the specific spacing of the data islands in that zone. The sync marks may be located in the sector headers for the data sectors. The physical location where data is to be written or read is identified by a head number, track number (also called "cylinder" number when there are multiple disks) and data sector number.

As the disk 10 rotates about its center 13 in the direction of arrow 20, the movement of actuator 130 allows the read/write head 109 on the trailing end of head carrier 122 to access different data tracks and zones on disk 10. Because the actuator 130 is a rotary actuator that pivots about pivot 132, the path of the read/write head 109 across the disk 10 is not a perfect radius but instead an arcuate line 135.

Each data track also includes a plurality of circumferentially or angularly-spaced servo sectors 120 that contain positioning information detectable by the read head for moving the head 109 to the desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 have an arcuate shape that generally replicates the arcuate path 135 of the head 109. The servo sectors 120 are nondata regions on the disk that are magnetized once, typically during manufacturing or formatting of the disk, and are not intended to be erased during normal operation of the disk drive. While the sync marks (like sync marks 173) may be located in the sector headers for the data sectors, as an alternative they may be located in the servo sectors 120.

Figure 2:
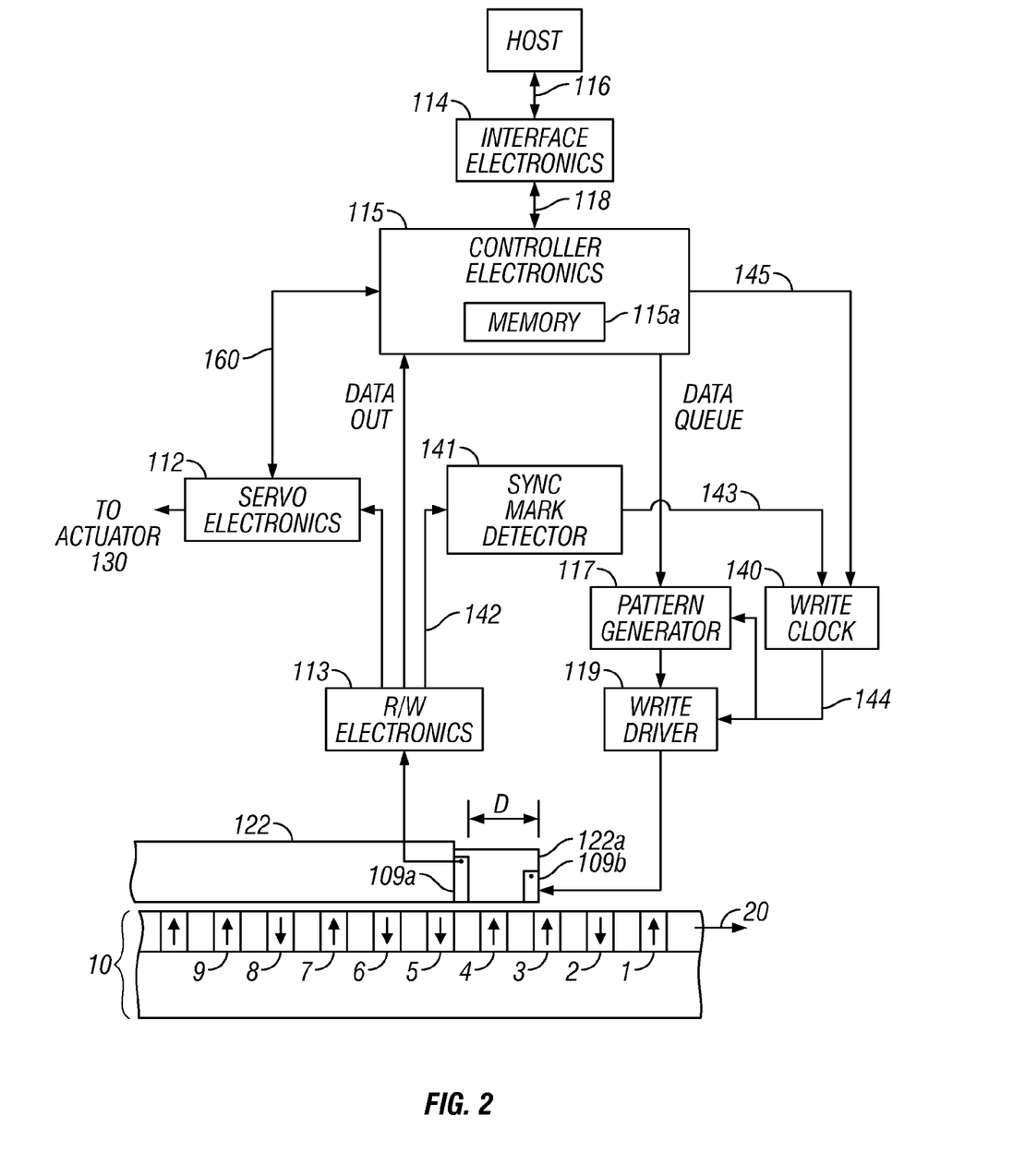
FIG. 2 is a block diagram of the electronics associated with the disk drive of the present invention and also shows a sectional view of the patterned-media magnetic recording disk.

FIG. 2 is a block diagram of the electronics associated with disk drive 100 and also shows a sectional view of the magnetic recording disk 10 with a magnetic recording layer of patterned media in the form of discrete magnetizable data islands 1-9. FIG. 2 also shows a portion of slider 122 with read/write head 109 that includes the read element or head 109a and the write element or head 109b. The read head 109a and write head 109b are formed on the trailing end 122a of slider 122. The arrows depicted in the islands 1-9 represent the magnetic moments or magnetization directions in the islands, and are depicted for perpendicular or out-of-plane magnetic recording. The recording or writing of data occurs by an inductive coil write head 109b that has a write pole that generates a magnetic field to magnetize the islands in one of the two magnetization directions, depending on the direction of current through the coil of the write head. Because there is no magnetic material between the islands 1-9, the write field magnetization reversals must be precisely timed to magnetize the appropriate islands. While FIG. 2 illustrates perpendicular patterned media, wherein the islands 1-9 are depicted with their moments oriented out of the plane of the recording layer, the invention is fully applicable to horizontal or longitudinal patterned media, wherein the islands 1-9 would have their moments oriented in the plane of the magnetic recording layer.

The disk drive electronics shown in FIG. 2 include read/write (R/W) electronics 113, servo electronics 112, controller electronics 115 and interface electronics 114. The R/W electronics 113 receives signals from read head 109a and passes servo information from the servo sectors 120 to servo electronics 112 and data signals from the data sectors to controller electronics 115.

Servo electronics 112 typically includes a servo control processor that uses the servo information from the servo sectors 120 to run a control algorithm that produces a control signal. The control signal is converted to a current that drives rotary actuator 130 to position the head 109. The operation of servo electronics 112 is explained in more detail with respect to FIG. 3, which is a schematic showing a portion of the patterned-media disk 10 (FIG. 1) with a typical patterned servo sector 120 spanning several data tracks. Three full data tracks and one half-track are depicted: 308, 309, 310 and half-track 311, each having a respective track centerline 328, 329, 330 and 331. The tracks are spaced about by the track pitch (Tp). The read head 109a is shown as positioned in data track 308 and will detect the islands in servo sector 120 as the disk rotates in the direction of arrow 20.

Figure 3:
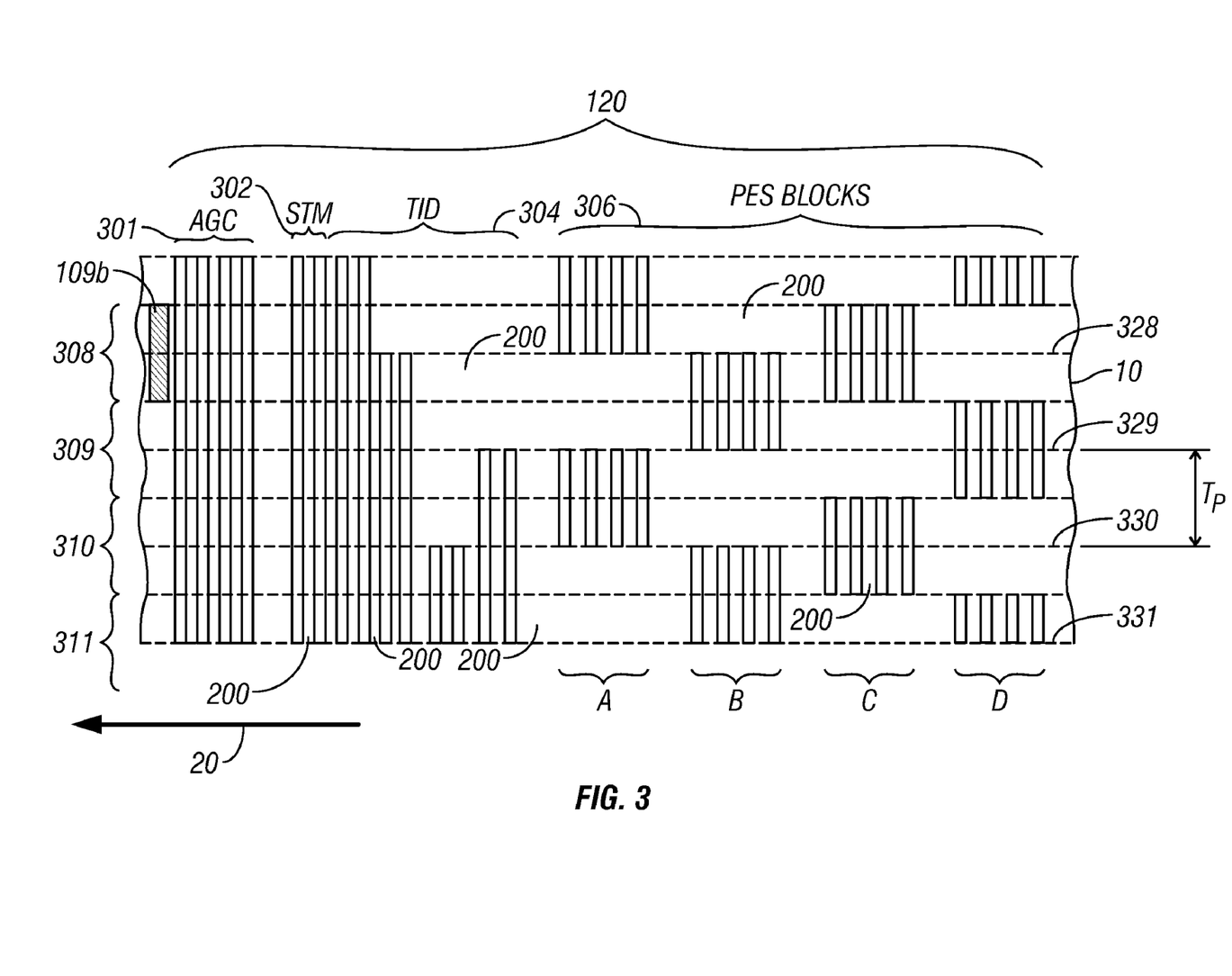
FIG. 3 is an illustration of a portion of a patterned-media disk with a typical patterned servo sector spanning several data tracks.

The servo sector 120 is a conventional servo pattern of the type commonly used in sector servo systems and shows a greatly simplified pattern for clarity. The servo pattern includes several fields containing nondata islands, which are shown as automatic gain control (AGC) field 301, servo-timing-mark (STM) field 302, track ID (TID) field 304 and position-error-signal (PES) field 306. PES field 306 is depicted as the well-known quadrature pattern of PES blocks or islands A-D. The PES islands A-D are used to determine the fractional part of the radial position of the head. When the head is at the track centers the read-back signal amplitudes from the A islands and the B islands are equal. When the head is at the half-track positions the amplitudes from the C islands and the D islands are equal. As the head moves off-track the amplitudes from all the islands will increase or decrease. The amplitudes of the PES islands are decoded or demodulated in servo electronics 112 to generate a PES that is used in the control algorithm run by the servo control processor to generate control signals to the actuator 130 (FIG. 1) to reposition the head. The PES from servo electronics 112 is also available to controller electronics 115 via line 160 (FIG. 2).

In FIG. 3 all of the islands in servo sector 120 are discrete blocks or islands of magnetic material and are magnetized in the same direction, either perpendicular to the recording layer (either into or out of the paper in FIG. 3) for perpendicular-recording media, or in the plane of the recording layer (either to the right or left in the along-the-track direction in FIG. 3) for horizontal-recording media. The islands are typically DC-magnetized by a large magnet during manufacturing. Each discrete island is a magnetized island separated from other islands by nonmagnetic regions or spaces represented as 200. The term "nonmagnetic" means that the spaces 200 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 200 may also be the absence of magnetic material, such as grooves or troughs in the magnetic recording layer or disk substrate.

Referring again to FIG. 2, interface electronics 114 communicates with a host system (not shown) over interface 116, passing data and command information. Interface electronics 114 also communicates with controller electronics 115 over interface 118. Interface electronics 114 receives a request from the host system, such as a personal computer (PC), for reading from or writing to the data sectors over interface 116. Controller electronics 115 includes a microprocessor and associated memory 115a. Controller electronics 115 receives a list of requested data sectors from interface electronics 114 and converts them into a set of numbers that uniquely identify the disk surface (head number associated with that disk surface), track (cylinder) and data sector. The numbers are passed to servo electronics 112 to enable positioning head 109 to the appropriate data sector.

FIG. 2 also shows schematically the transfer of data between a host system, such as a PC, and the disk drive 100. The signals from recorded data islands in the data sectors are detected by read head 109a, and amplified and decoded by read/write electronics 113. Data is sent to controller electronics 115 and through interface electronics 114 to the host via interface 116. The data to be written to the disk 10 is sent from the host to interface electronics 114 and controller electronics 115 and then as a data queue to pattern generator 117 and then to write driver 119. The write driver 119 generates current whose direction is switched at high-frequency to the coil of write head 109b. This results in reversal of the direction of the magnetic write fields that magnetize the data islands 1-9. The write clock 140, which is capable of operating at different frequencies corresponding to the different data zones, outputs a clock signal on line 144 to control the timing of pattern generator 117 and write driver 119. A sync mark detector 141 receives the readback signal from R/W electronics 113 on input line 142 and outputs a signal on line 143 to control the timing of write clock 140. The sync mark detector 141 detects the sync marks (like sync marks 173 in FIG. 1) that are sensed by the read head 109a and sent to R/W electronics 113. The sync mark spacing in each zone is different so sync mark detector 141 enables the write clock 140 to be synchronized with the spacing of the data islands in each of the different zones. FIG. 2 also shows a physical spacing D between the read head 109a and the write head 109b.

Figure 4:
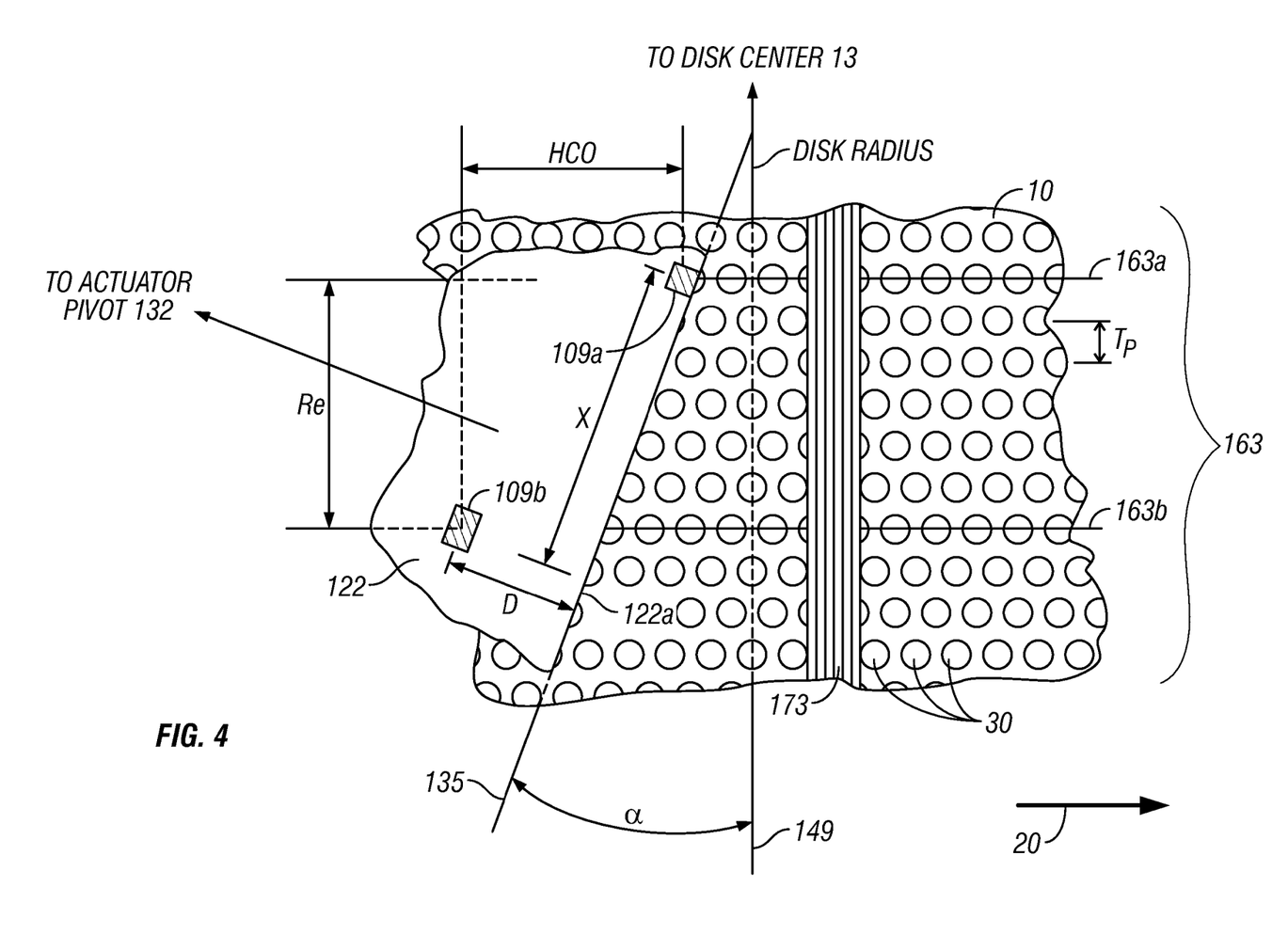
FIG. 4 is a top view of a portion of the slider on a surface of a patterned-media disk and shows the head circumferential offset (HCO) between the read head and write head.

FIG. 4 is a top view of a portion of slider 122 on a surface of patterned-media disk 10 and shows the relationship between the read head 109a, write head 109b and typical patterned data tracks 163 with typical data islands 30. The tracks are spaced apart radially by a distance called the track pitch (Tp). All the data island patterns in the tracks 163 are shown as being precisely aligned circumferentially with one another, with an intended one-half block circumferential shift of the patterns in alternate tracks. The advantage of having the data island pattern in each track shifted in the along-the-track direction by one-half the block spacing from the blocks in adjacent tracks is that any readback signal interference from an adjacent track will be out of phase with the readback signal from the track being read, which results in a substantially reduced error rate for the data being read. Also, in FIG. 4 the data islands are depicted as circular, but the data islands may have other shapes, including rectangular with different aspect ratios (radial height to circumferential width).

Figure 5:
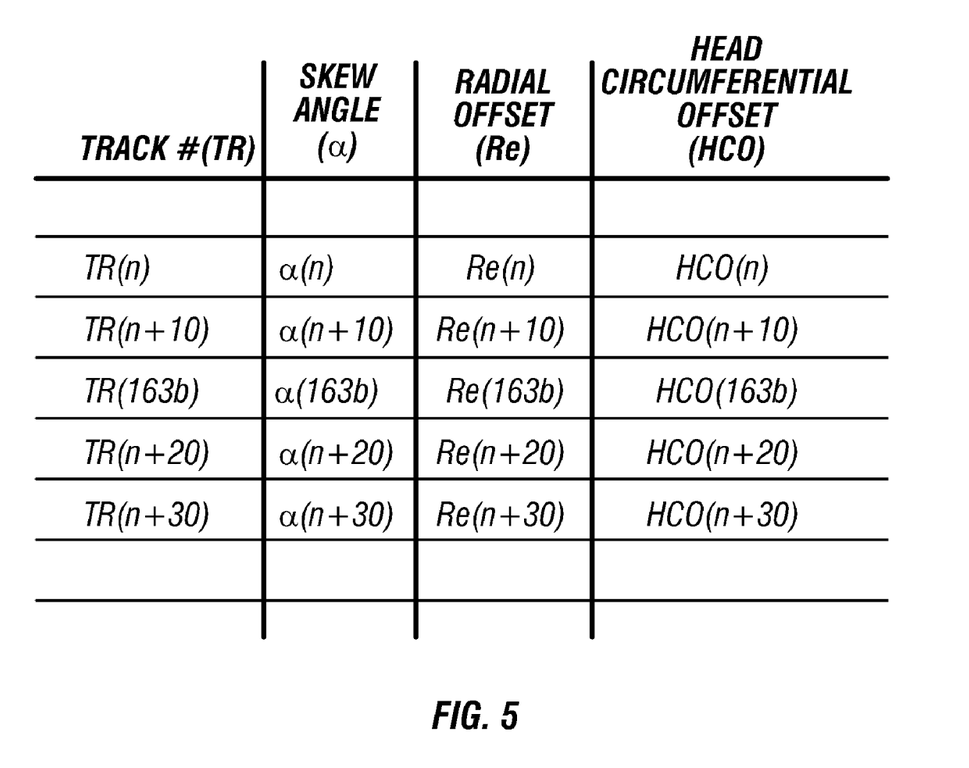
FIG. 5 is a lookup table showing effective radial offset ($R_e$) values and HCO values as a function of track number.

FIG. 4 shows the physical spacing D in the generally circumferential or along-the-track direction between the read head 109a and the write head 109b. The physical spacing D does not vary much from head to head, but there still is some variation due to variations in the thicknesses of the films deposited in the head fabrication process. Additionally, due to tolerances in fabrication there is typically also a radial or generally cross-track physical spacing X between the read head 109a and write head 109b. The cross-track spacing X is not the same for each head but typically has a statistical variation among the heads in the same fabrication process. Because the slider 122 is mounted to the rotary actuator that rotates about pivot 132 its path is an arcuate path 135 that is not aligned with the disk radius 149. As shown in FIG. 4, the end face 122a of slider 122 makes an angle α (called the skew angle) with the disk radius 149, with skew angle α being a known function of disk radius and thus track number. As a result of the circumferential spacing D, cross-track spacing X and skew angle α, there is an effective radial offset $R_e$ between read head 109a and write head 109b, with radial offset $R_e$ being a known function of track number. In a disk drive using patterned media with an areal density around 1 Terabit per square inch, the track pitch (the radial spacing between adjacent tracks) may be in the range of about 25 to 50 nm and the maximum skew angle α may be about 15 degrees. Manufacturing tolerances result in X being between +/−1 micron and D is typically about 8 microns. As a result, the maximum $R_e$ may be about 3 microns, or as much as 120 times Tp. In FIG. 4, to fully illustrate the relationship among the values of α, D, X and $R_e$, these values are not shown as being precisely to scale. Conventional approaches exist for measuring the effective read head/write head radial offset $R_e$ as a function of radius in a disk drive and storing this information in the disk drive's drive electronics for track-following control during reading and writing of data. For example, the disk drive may include a lookup table stored in memory 115a accessible by controller electronics 115. FIG. 5 is an example of a portion of a lookup table that shows track numbers (TR) and associated values of skew angle α and radial offset $R_e$ for every $10^{th}$ track between tracks n and n+30 for one specific head. A table like FIG. 5 will typically be required for each head in the disk drive because the value X is not the same for each head. It is typically not necessary for the lookup table to store values of $R_e$ for every track. Values for every N tracks, for example where N is 100 or 1000, can be stored in the lookup table and an interpolation method used to determine the values for a selected track. As an alternative to the use of a lookup table, the processor in controller electronics 115 may calculate $R_e$ for a selected track number from an equation stored in memory 115a, with the equation generated by a curve-fitting algorithm for values of track number and measured $R_e$ values. The values of $R_e$ are typically a non-integer number of Tp.

This effective radial offset $R_e$ between the read head 109a and write head 109b means that when the write head 109b is positioned to write on a selected track 163b, the read head 109a will be positioned over a different track 163a. In FIG. 4, for ease of illustration, the read head 109a is depicted as being on the centerline of track 163a when the write head 109b is positioned on the centerline of track 163b, so that $R_e$ in this example would be an integer number of Tp. However, $R_e$ is typically a non-integer number of Tp. For example, if $R_e$ is equal to 90.12Tp, this means that the servo electronics 112 will maintain the read head 109a at a position 0.12Tp from the track centerline of a track that is 90 tracks displaced from track 163b, the track where the write head 109b is writing.

As shown in FIG. 4, the value of $R_e$ together with the skew angle α results in a head circumferential offset (HCO) between the read head 109a and the write head 109b. As can be appreciated from FIG. 4, because the skew angle α varies with disk radius, the value of HCO also varies with disk radius and can be calculated from the known values of D, α and the measured values of X. Thus, when the read head 109a detects a sync mark 173 as the disk rotates in the direction of arrow 20, the write head 109b will not be precisely aligned with that sync mark, but will be circumferentially offset by an amount HCO. Thus an adjustment to the phase of write clock 140 must be made to compensate for HCO to assure that the write current reversals are synchronized to the location of the data islands 30 in the selected track 163b.

Figure 6:
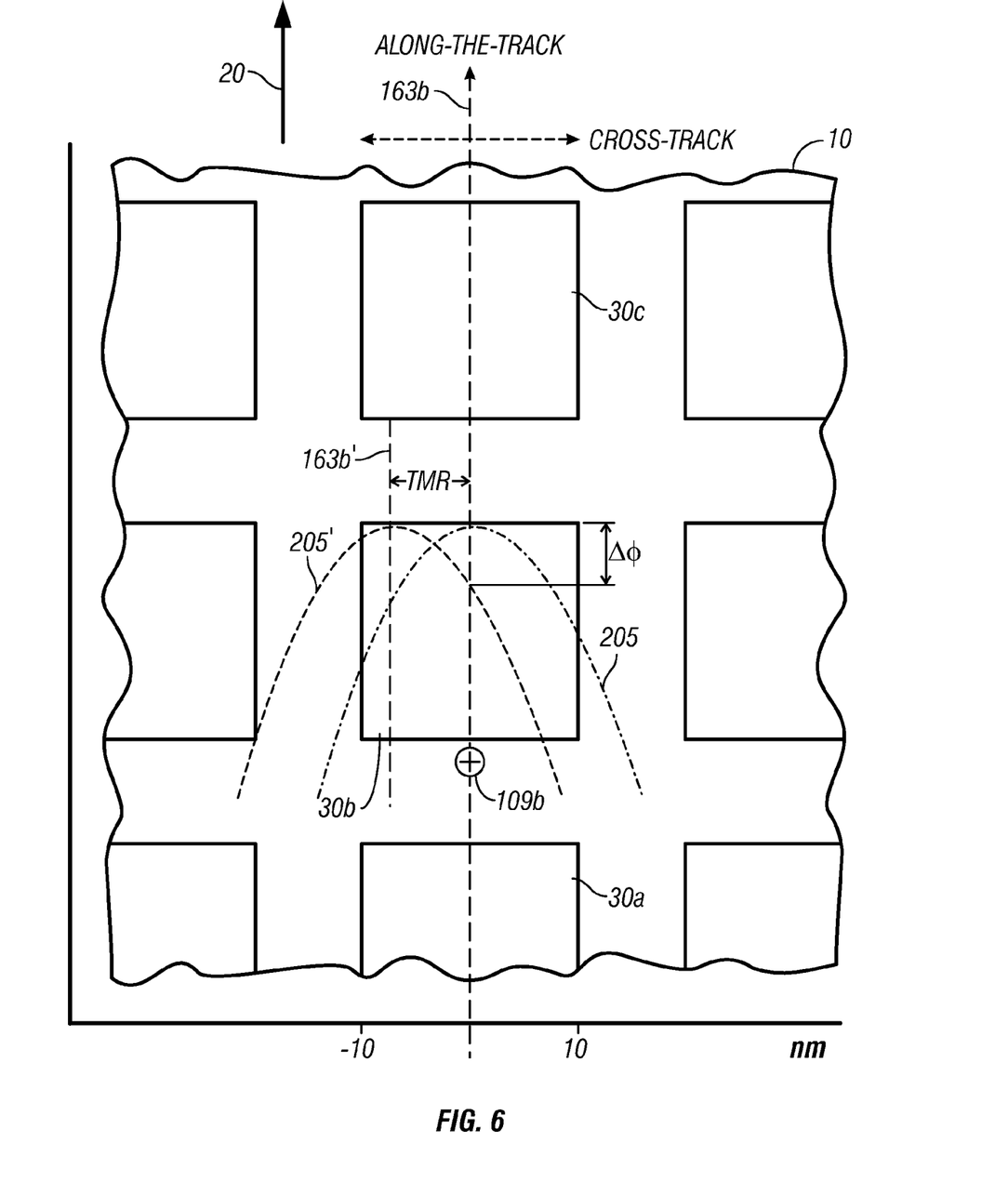
FIG. 6 is a schematic showing a portion of patterned-media disk with data islands and the write bubble contour from the write head when the write head is aligned with a track centerline and when the write head has a track misregistration (TMR) from the track centerline.

FIG. 6 is a schematic showing a portion of patterned-media disk 10 with data tracks, including data track 163b with data islands 30a, 30b and 30c. The data islands 30a-30c are shown as being generally rectangularly shaped with dimensions of 20 nm by 20 nm. The center of the write head 109b is shown aligned with the centerline of track 163b. The write head 109b generates a three-dimensional magnetic field as the disk and thus the data islands 30a-30c move in the direction of arrow 20 past the write head 109b. The curved line 205 represents an intersection of this three-dimensional magnetic field with the plane of the recording layer that contains the data islands 30. This intersection (curved line 205) is the outer contour or boundary of the magnetic field write "bubble", i.e., the location where the magnetic field has a strength sufficient to switch the magnetization of the individual data islands. Because the islands do not have precisely identical magnetic properties as a result of tolerances in the fabrication process, they will have a switching field distribution, meaning that some islands will require a slightly higher magnetic field than others to switch their magnetization. This introduces some uncertainty or jitter into when each island reverses its magnetization. However, for the purpose of this invention the magnetization reversal of the islands is based on the switching behavior of an "average" island. Also, the magnetic field within the write bubble is not constant over the whole island.

The writing (magnetization reversal) of data island 30b occurs when the geometric center of the island is within the write bubble, and the permanent fixing of the magnetic state of the island occurs when the geometric center of the island passes through the boundary 205 of the write bubble into the region where the field (averaged over the whole island) is below the switching field for the island. The optimum phase of the write clock for minimizing write errors depends on the position of the write head 109b with respect to the center of track 163b. This is because, as shown in FIG. 6, the write bubble is curved at its trailing edge or boundary 205. If the write head 109b position is shifted relative to the track centerline by the TMR, such that the center of the write head follows 163b' instead of 163b, then the center of the island 30b passes through the boundary 205' of the write bubble of the shifted write head sooner than it would pass through the boundary 205 of the write bubble of the unshifted write head. This results in an effective shift of Δφ in the timing of when the center of the island 30b passes through the boundary of the write bubble.

In this invention an adjustment to the phase of write clock 140 (FIG. 2) is made to compensate for $\Delta_T$ to assure that the magnetization reversals of the write field are synchronized to the location of the data islands 30a-30c in the selected data track 163b. The TMR of the write head away from the track centerline 163b corresponds to the PES from the servo electronics 112. During writing, if the read head 109a is maintained precisely on the data track 163a (FIG. 4), then the value of PES will be zero, the write head 109b will be precisely on the centerline of selected data track 163b and no write clock phase adjustment for TMR is necessary. However, because of the finite response time of the servo system to maintain the read head 109a precisely on the centerline of track 163a (FIG. 4) and because of disturbances due to electrical noise and mechanical vibration, the write head 109b will typically be offset by some value of TMR from the centerline of data track 163b. Thus by adjusting the phase of the write clock 140 to compensate for TMR the likelihood of writing the correct data on the selected track is increased.

Figure 7:
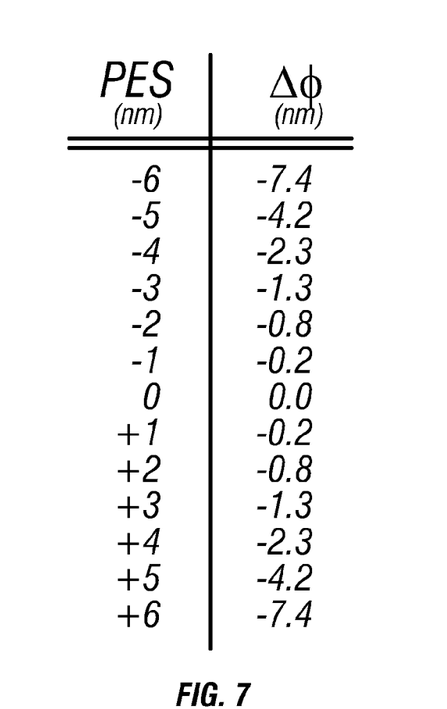
FIG. 7 is a lookup table showing position error signal (PES) values and associated write clock phase adjustment values for TMR (Δφ).

To compensate for TMR of the write head the disk drive may include a lookup table stored in memory 115a accessible by controller electronics 115. FIG. 7 is an example of a portion of a lookup table that shows PES values (which correspond to TMR values) in units of nm and associated values of the phase adjustment due to TMR (Δφ) in nm. A table like FIG. 7 will typically be required for each head in the disk drive. As an alternative to the use of a lookup table, the processor in controller electronics 115 may calculate Δφ from a set of computer program instructions stored in memory 115a, with the instructions representing an equation generated by a curve-fitting algorithm for values of PES and measured Δφ values.

One method for generating the lookup table of FIG. 7 is described as follows. First, the optimum write phase for writing with the write head well-centered on a track is determined. This is accomplished by writing pseudo-random data with the write clock having a known phase relationship with the write synchronization pattern (sync marks 173 in FIG. 1) read by the read head. A large enough number of data sectors are written, for example all the data sectors in one complete circular track, so that good statistics can be gathered on error rate. Then the error rate of this written data is checked by reading back the written track and comparing it to the known written pseudo-random data. Alternatively, the disk drive's error correction coding (ECC) can be used to analyze the number of errors. Then this writing of pseudo-random data and checking of the error rate is performed multiple times, each time after making a small shift in the write clock phase. This is continued until the write clock has been stepped through a full cycle of possible phases. The error rate will follow an expected behavior, with a minimum error rate occurring at one particular write clock phase and increasing to a maximum error rate when the write clock phase is shifted by approximately 180 degrees from the optimum. By analyzing the error rate of all iterations, the optimum write phase can be determined which corresponds to the case where the write head is well-centered on the track.

Once the optimum phase for writing on the center of the track has been established as described above, a similar test is then performed with the write head intentionally offset from the track centerline by a known amount of TMR. By iterating this procedure at a number of off-track positions (for example, stepping 1 nm at a time to both sides of the track centerline) the optimum phase ($\Delta\phi$) as a function of offset (TMR) from the track centerline is determined. Since TMR is directly related to PES, this procedure results in the table of FIG. 7, i.e., the table of values of PES and associated values of phase adjustment due to TMR ($\Delta\phi$). This procedure is then repeated for each head in the disk drive, resulting in a table like FIG. 7 for each head.

Figure 8:
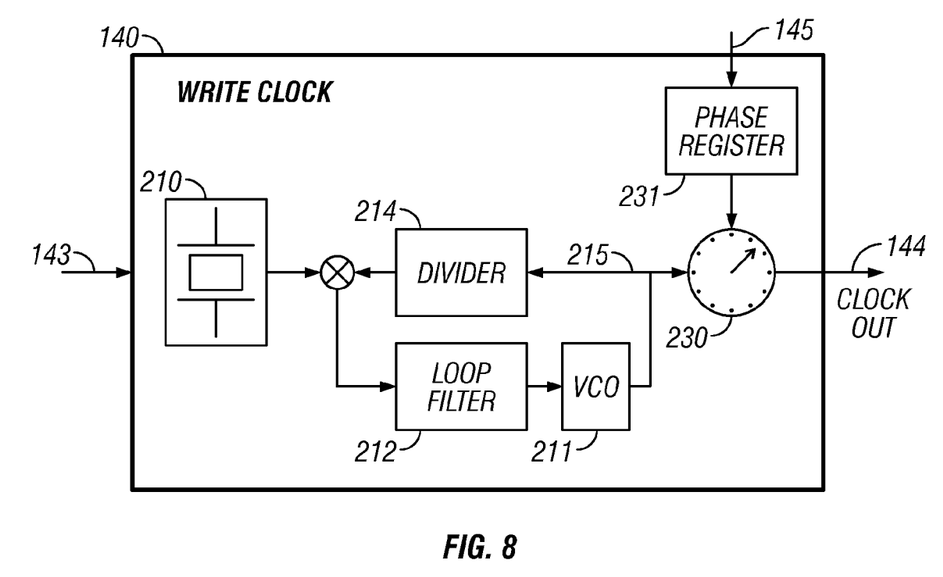
FIG. 8 is a block diagram of the write clock controlled by input from the synchronization (sync) mark detector with phase rotator controlled by input from the controller electronics.

FIG. 8 is a block diagram of the write clock 140 and will be used to explain the method of adjusting the phase of the write clock to compensate for both HCO and TMR. The write clock 140 may be a voltage-controlled oscillator (VCO) 211 in a conventional phase-locked loop (PLL) with a crystal reference 210 and loop filter 212. The frequency and phase of write clock 140 is initially set by the sync mark detection signal 143 from sync mark detector 141 which detects sync marks 173 (FIG. 1) as the disk 10 rotates in the direction of arrow 20. The divider 214 allows the write clock frequency to be adjusted, for example in multiples of a small fraction of the frequency of the crystal reference 210. This enables the PLL output 215 to be set to different output frequencies depending on the frequency of the data zone containing the selected track where data is to be written. The settings in divider 214 should be selected so the PLL output is as close as possible to the desired write clock frequency to minimize the average size of phase updates at phase rotator 230. The write clock signal is generated in equally-spaced primary phases, and by analog interpolation it is possible to generate clocks with a phase intermediate the primary phases. For example, the clock output at line 144 may be capable of 64 equally-spaced clock phases. The phase rotator 230, also called a "mixer", controls which clock phase is selected for output on line 144.

Also shown in FIG. 8 is the phase adjustment for HCO and TMR, shown as input 145 from controller electronics 115 to the phase rotator 230. The controller electronics 115 calculates HCO from the known relationship between HCO and the track number for the selected data track where data is to be written. This is done as described above by use of the lookup table (FIG. 5) or by calculating HCO for a selected track number from an equation stored in memory 115a. After the read head 109a has settled generally along the centerline of track 163a, the servo sectors 120 (FIG. 1) are detected as the disk rotates in the direction of arrow 20. The servo electronics 112 (FIG. 2) generates a PES for each servo sector 120. The PES is passed to controller electronics 115 which then calculates $\Delta\phi$ from the known relationship between $\Delta\phi$ and PES. This is done as described above by use of the lookup table (FIG. 7) or by calculating $\Delta\phi$ from an equation stored in memory 115a. The phase adjustment value corresponding to HCO and the value of $\Delta\phi$ (the phase adjustment due to TMR) are summed as a total phase adjustment. This total phase adjustment value may stored in an optional phase register 231 for input to phase rotator 230. The output of phase register 231 signals phase rotator 230 to advance or retard the write clock phase, and thus to adjust its frequency and phase so as to be synchronized for writing to the data islands. Thus with the correct phase adjustment, when the read head 109a detects sync marks in its track 163a, and with the write head off the centerline of track 163b by some amount of TMR as determined by the PES value, the write clock 140 will cause write current reversals from write driver 119 to be precisely synchronized with the data islands in the selected data track 163b.

The PES value generated by servo electronics 112 and used by controller 115 may be the measured PES value as determined from the demodulated signal from PES blocks 306 (FIG. 3) in the servo sectors 120. However, disk drive digital servo control systems typically use a state estimator, which is a standard control system element in which the dynamics of the system are expressed as a system of state equations. The state of the system is represented as a vector of real numbers and the estimate for the current state is calculated from the estimated state from the previous samples. Thus the PES value used by controller 115 may be the PES estimate from previous measured PES samples.

The write synchronization system and method as described above and illustrated with various block diagrams may be implemented in conventional analog or digital hardware components or in software. The servo control processor, the processor in the controller electronics, or other microprocessor in the disk drive, may perform the method, or portions of the method, using algorithms implemented in computer programs stored in memory accessible to the processor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a rotatable magnetic recording disk having a plurality of generally circular data tracks, a plurality of angularly spaced synchronization marks extending generally radially across the data tracks, and a plurality of angularly spaced servo sectors extending generally radially across the data tracks, each data track patterned into discrete magnetizable data islands;
   a read head for sensing the synchronization marks and the servo sectors;
   a write head for writing data to the data tracks by generating a magnetic write field to magnetize the data islands in the data tracks;
   a head carrier supporting the read head and write head;
   a rotary actuator connected to the head carrier for moving the read head and write head generally radially across the data tracks;
   a controller for selecting a data track where data is to be written by the write head;
   a write clock coupled to the write head for controlling reversals of the magnetic write field to the data islands in the selected data track;
   servo electronics coupled to the read head for generating a head position error signal (PES) in response to servo sectors detected by the read head, the PES representing track misregistration (TMR) of the write head from the centerline of the selected data track;
   synchronization mark detection circuitry coupled to the read head for controlling the write clock in response to synchronization marks detected by the read head; and
   phase adjustment circuitry for adjusting the phase of the write clock in response to the PES to thereby correct for TMR of the write head.

2. The disk drive of claim 1 wherein the controller is coupled to the servo electronics and the phase adjustment circuitry and further comprising memory accessible by the controller, the memory containing a table of PES values and associated TMR phase adjustment values, and wherein the controller receives the PES values and recalls from said table the associated TMR phase adjustment values.

3. The disk drive of claim 1 wherein the controller is coupled to the servo electronics and the phase adjustment circuitry and further comprising memory accessible by the controller, the memory containing a program of instructions readable by the controller for calculating a TMR phase adjustment value from a PES value.

4. The disk drive of claim 1 wherein the servo electronics generates a measured PES.

5. The disk drive of claim 1 wherein the servo electronics generates an estimated PES.

6. The disk drive of claim 1 wherein each data track has an associated head circumferential offset (HCO) value representing the circumferential offset of the write head from the read head, and wherein the phase adjustment circuitry adjusts the phase of the write clock with an HCO phase adjustment value for said selected data track.

7. The disk drive of claim 6 wherein the phase adjustment circuitry adjusts the phase of the write clock in response to the PES with a TMR phase adjustment value, and wherein the phase adjustment circuitry sums the TMR phase adjustment value with the HCO phase adjustment value for said selected data track.

8. The disk drive of claim 1 wherein the write clock has adjustable phases and the phase adjustment circuitry comprises a phase register, and wherein the phase of the write clock is adjusted by the value in said phase register.

9. The disk drive of claim 1 wherein the write clock includes a phase rotator and wherein the phase register provides an output to control the phase rotator.

10. The disk drive of claim 1 wherein the synchronization marks are located within the servo sectors.

11. The disk drive of claim 1 wherein the data tracks are grouped into a plurality of radially spaced bands, and wherein the write clock is capable of operating at different frequencies, each band being associated with a unique write clock frequency.

12. A method for synchronizing the writing of data on discrete magnetizable data islands of a patterned-media disk drive, the disk drive having (a) a rotatable magnetic recording disk having a plurality of generally circular data tracks, a plurality of angularly spaced synchronization marks extending generally radially across the data tracks, and a plurality of angularly spaced servo sectors extending generally radially across the data tracks, each data track patterned into discrete magnetizable data islands; (b) a write head for writing data in the data tracks by generating a magnetic write field to magnetize the data islands; (c) a write clock coupled to the write head for controlling reversals of the magnetic write field to the data islands; (d) a read head for sensing the synchronization marks and the servo sectors; (e) servo electronics coupled to the read head for generating a head position error signal (PES) in response to servo sectors sensed by the read head, the PES representing track misregistration (TMR) of the write head from the centerline of a data track where data is to be written; (f) a processor for receiving synchronization mark signals from the read head and generating a phase adjustment signal to the write clock; and (g) memory coupled to the processor and containing a program of instructions readable by the processor; the processor-implemented method comprising:
  identifying the selected data track on which data is to be written;
  receiving the PES when the write head is on the selected data track;
  generating, from the PES, a write clock TMR phase adjustment value; and
  transmitting to the write clock the TMR phase adjustment value.

13. The method of claim 12 wherein the memory contains a table of PES values and associated TMR phase adjustment values, and wherein the controller generates the write clock TMR phase adjustment value by recalling from said table the TMR phase adjustment value associated with the PES.

14. The method of claim 12 wherein the processor-implemented method of generating, from the PES, a write clock TMR phase adjustment value comprises calculating, from an equation representing TMR phase adjustment value as a function of PES value, the write clock TMR phase adjustment value.

15. The method of claim 12 wherein the processor-implemented method of receiving the PES when the write head is on the selected data track comprises receiving the measured PES from the servo electronics.

16. The method of claim 12 wherein the processor-implemented method of receiving the PES when the write head is on the selected data track comprises receiving the estimated PES from the servo electronics.

17. The method of claim 12 wherein each data track has an associated head circumferential offset (HCO) value representing the circumferential offset of the write head from the read head, the processor-implemented method further comprising:
  generating, from the HCO value for said selected data track, a write clock HCO phase adjustment value; and
  transmitting to the write clock the HCO phase adjustment value.

18. The method of claim 17 further comprising summing the TMR phase adjustment value with the HCO phase adjustment value, and wherein transmitting the TMR phase adjustment value and the HCO phase adjustment value comprises transmitting said summed value.

19. The method of claim 12 wherein the synchronization marks are located within the servo sectors.

20. The method of claim 12 wherein the data tracks are grouped into a plurality of radially spaced bands, and wherein the write clock is capable of operating at different frequencies, each band being associated with a unique write clock frequency.

* * * * *